United States Patent
Dhanabalan et al.

(10) Patent No.: US 11,095,567 B2
(45) Date of Patent: *Aug. 17, 2021

(54) SYSTEM AND METHOD TO OPTIMIZE WORKFLOW

(71) Applicant: Citrix Systems, Inc., Fort Lauderdale, FL (US)

(72) Inventors: Praveen Raja Dhanabalan, Bengaluru (IN); Saurabh Pant, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,239

(22) Filed: Mar. 4, 2020

(65) Prior Publication Data
US 2020/0213241 A1     Jul. 2, 2020

Related U.S. Application Data

(63) Continuation of application No. 15/969,308, filed on May 2, 2018, now Pat. No. 10,587,525.

(51) Int. Cl.
*H04L 12/841* (2013.01)
*H04L 29/08* (2006.01)

(52) U.S. Cl.
CPC .............. *H04L 47/28* (2013.01); *H04L 67/10* (2013.01)

(58) Field of Classification Search
USPC ........................................................ 709/204
See application file for complete search history.

(56) References Cited

U.S. PATENT DOCUMENTS

| | | | | |
|---|---|---|---|---|
| 9,088,533 | B1* | 7/2015 | Zeng | G06N 3/084 |
| 9,628,950 | B1* | 4/2017 | Noeth | H04L 67/10 |
| 2005/0240655 | A1* | 10/2005 | Lipton | H04L 51/24 |
| | | | | 709/207 |
| 2010/0011071 | A1* | 1/2010 | Zheleva | H04L 51/12 |
| | | | | 709/206 |
| 2017/0262804 | A1* | 9/2017 | Shroff | G06Q 10/0833 |

OTHER PUBLICATIONS

Non-Final Office Action for U.S. Appl. No. 15/969,308, dated Jul. 26, 2019.

Notice of Allowance for U.S. Appl. No. 15/969,308, dated Oct. 31, 2019.

\* cited by examiner

*Primary Examiner* — Hermon Asres
(74) *Attorney, Agent, or Firm* — Foley & Lardner LLP (57) ABSTRACT

The present disclosure describes a system and method to reduce the overall time taken to complete distributed process workflows. Each workflow can include multiple actions that are completed by or at different client devices. The actions of a workflow can be dependent on prior actions in the workflow. For example, a second client device may not be able to complete a second action until a first client device completes a first action in the workflow. The system can predict time periods and the geolocations where client devices are most likely to complete an assigned action. Using the selected time periods and geolocations, the system can transmit notifications to the client devices when the action is most likely to be completed.

14 Claims, 3 Drawing Sheets

SYSTEM AND METHOD TO OPTIMIZE WORKFLOW

CROSS-REFERENCE TO RELATED APPLICATION

This patent application is a continuation of, and claims priority to and the benefit of U.S. patent application Ser. No. 15/969,308, titled "SYSTEM AND METHOD TO OPTIMIZE WORKFLOW," and filed May 2, 2018, the contents of which are hereby incorporated herein by reference in its entirety for all purposes.

BACKGROUND

Workflows can include a plurality of computational actions. The computational actions can be performed by one or more devices within a networked environment. In some implementations, the computational actions need to be completed in an ordered sequence. For example, a first action may need to be completed before a second action can be started. The sequential nature of the computational actions within the workflow can cause backlogs of actions to be completed at client devices. The growing backlog of actions can cause an increase in the time required to complete a workflow.

BRIEF SUMMARY OF THE DISCLOSURE

The present disclosure describes a system and method to reduce the overall time taken to complete distributed process workflows. Each workflow can include multiple actions that are completed by or at different client devices. The actions of a workflow can be dependent on prior actions in the workflow. For example, a second client device may not be able to complete a second action until a first client device completes a first action in the workflow. The system can predict time periods and the geolocations where client devices are most likely to complete an assigned action. Using the selected time periods and geolocations, the system can transmit notifications to the client devices when the action is most likely to be completed.

According to at least one aspect of the disclosure, a system to reduce transmission times in a networked system can include a memory storing processor executable instructions and one or more processors. The system can generate a notification message indicating a first action to be performed in a distributed process. The system can identify a plurality of features associated with the first action to be performed in the distributed process. The system can select a plurality of time windows for each of a plurality of device locations based at least on the plurality of features. The system can determine a confidence value for each of the plurality of time windows. The confidence value indicating a likelihood of the first action being completed during each of the respective plurality of time windows. The system can select a time window from the plurality of time windows for one of the plurality of device locations based at least on the confidence value of the time window. The system can transmit the notification message to a device located at the one of the plurality of device locations after a start time of the time window.

The system can determine a time duration of the time window. The system can hold the notification message until a predetermined device enters the one of the plurality of device locations based on the time duration being below a predetermined threshold. The system can determine a predetermined device is not within the one of the plurality of device locations at the end of the time window, and can transmit the notification message to the device at the end of the time window.

The system can prefetch content associated with the first action to the device before the start time of the time window. The system can receive location information of the device and select the time window from the plurality of time windows based on the location information of the device.

The system can generate a second notification message indicating a second action to be performed in the distributed process. The system can transmit the second notification message to a second device. The system can transmit a third notification message indicating a third action to be performed in the distributed process to a third device before receiving an indication that the second device completed the second action.

The system can select a second time window from the plurality of time windows. The second time window can have a time duration shorter than the time window and can be associated with a second device location. The system can transmit the notification message to a second device at the second device location. The system can transmit the notification message to the device located at the one of the plurality of device locations based on not receiving an indication that the device at the second device location completed the second action.

The plurality of features can include at least one of location information, an action duration, a historical usage, a time zone, or a user designation. The confidence value for each of the plurality of time windows at each of the plurality of device locations can be generated using a machine learning based regression algorithm.

According to at least one aspect of the disclosure, a method to reduce transmission times in a networked system can include generating a notification message indicating a first action to be performed in a distributed process. The method can include determining a plurality of features associated with the first action to be performed in the distributed process. The method can include select a plurality of time windows for each of a plurality of device locations based at least on the plurality of features. The method can include determining a confidence value for each of the plurality of time windows. The confidence value can indicate a likelihood of the first action being completed during each of the respective plurality of time windows. The method can include selecting a time window from the plurality of time windows for one of the plurality of device locations based at least on the confidence value of the time window. The method can include transmitting the notification message to a device located at the one of the plurality of device locations after a start time of the time window.

The method can include determining a time duration of the time window. The method can include holding the notification message until a predetermined device enters the one of the plurality of device locations based on the time duration being below a predetermined threshold. The method can include determining that a predetermined device is not within the one of the plurality of device locations at the end of the time window. The method can include transmitting the notification message to the device at the end of the time window. The method can include prefetching content associated with the first action to the device before the start time of the time window.

The method can include receiving location information of the device. The method can include selecting the time window from the plurality of time windows based on the location information of the device. The method can include generating a second notification message indicating a second action to be performed in the distributed process. The method can include transmitting the second notification message to a second device. The method can include transmitting a third notification message indicating a third action to be performed in the distributed process to a third device before receiving an indication that the second device completed the second action.

The method can include selecting a second time window from the plurality of time windows. The second time window can have a time duration shorter than the time window and can be associated with a second device location. The method can include transmitting the notification message to a second device at the second device location.

The method can include transmitting the notification message to the device located at the one of the plurality of device locations based on not receiving an indication that the device at the second device location completed the second action. The plurality of features can include at least one of location information, an action duration, a historical usage, a time zone, or a user designation. The confidence value for each of the plurality of time windows at each of the plurality of device locations can be generated using a machine learning based regression algorithm.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods reducing completion times of distributed processes.

A. Computing Environment

Prior to discussing the specifics of embodiments of the systems and methods to reduce transmission times in a networked system, it may be helpful to discuss the computing environments in which such embodiments may be deployed.

Figure 1:
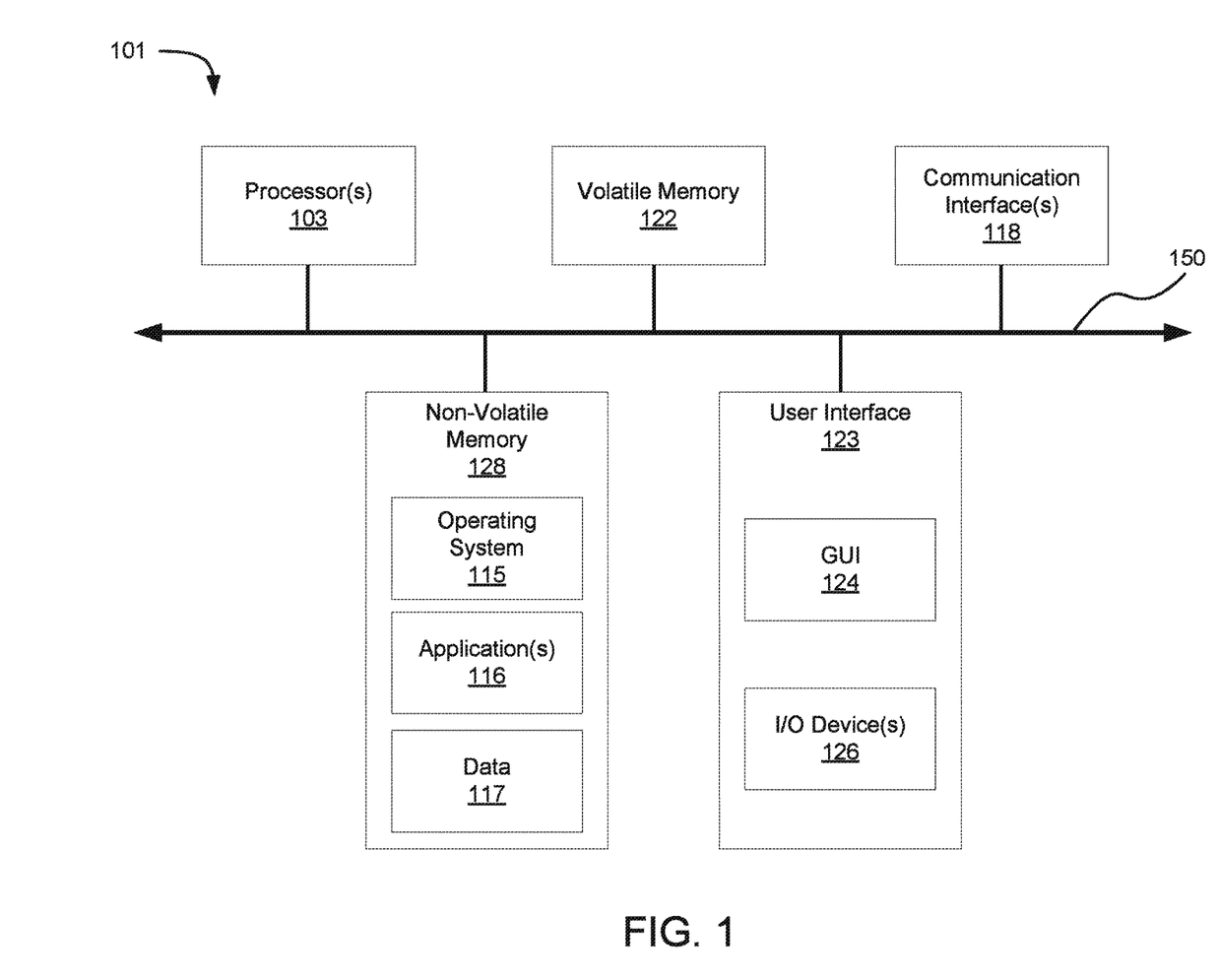
FIG. 1 illustrates a block diagram of an embodiment of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods Reducing Completion Times of Distributed Processes

The present disclosure describes a system and method to reduce the overall time taken to complete distributed process workflows. A workflow can include multiple actions that, in some examples, must be completed in a predetermined order. Based on a first action being completed, the system can transmit a notification message (which can also be referred to as a notification or a message) to a second client device indicating that work can begin on a second action in the workflow. For example, the distributed process can be a document review process that can include the generation of a document by a first user at a first client device, review of the document by a second user a second client device, and approval by a third user at a third client device. Each of the client devices can be located at different locations and in different time zones. Completion of the document generation by the first user can cause the system to transmit a notification to the second user's client device indicating that the second user can begin the second action of reviewing the document generated during the first action.

Because the first user may complete the first action (causing a notification about the second action to be transmitted to the second client device) at a time when the second user cannot work on the second action the notification may be ignored by the second user. For example, notification may be missed because the user is not at the client device or because the notification can be deprioritized by later arriving notifications. In another example, the second user may be in a different time zone than the first user, which can cause the notification of the second action to reach the second user's client device when the second user is not at work. In some implementations, users may be associated with multiple locations and/or client devices. In these cases, the system may to select to which of the locations or client devices the notification should be transmitted. Because the notifications for subsequent actions can reach client devices and users when the actions associated with the notifications cannot be acted upon, the total time to complete a workflow can be reduced by holding and transmitting notifications to client devices and user when the user can act on the actions associated with the notification. Predicting when and at which client device a user will complete an action can also enable the system to prefetch data or content associated with the action to the respective client device. This can save bandwidth compared to prefetching the data to each of the client devices associated with the user.

Figure 2:
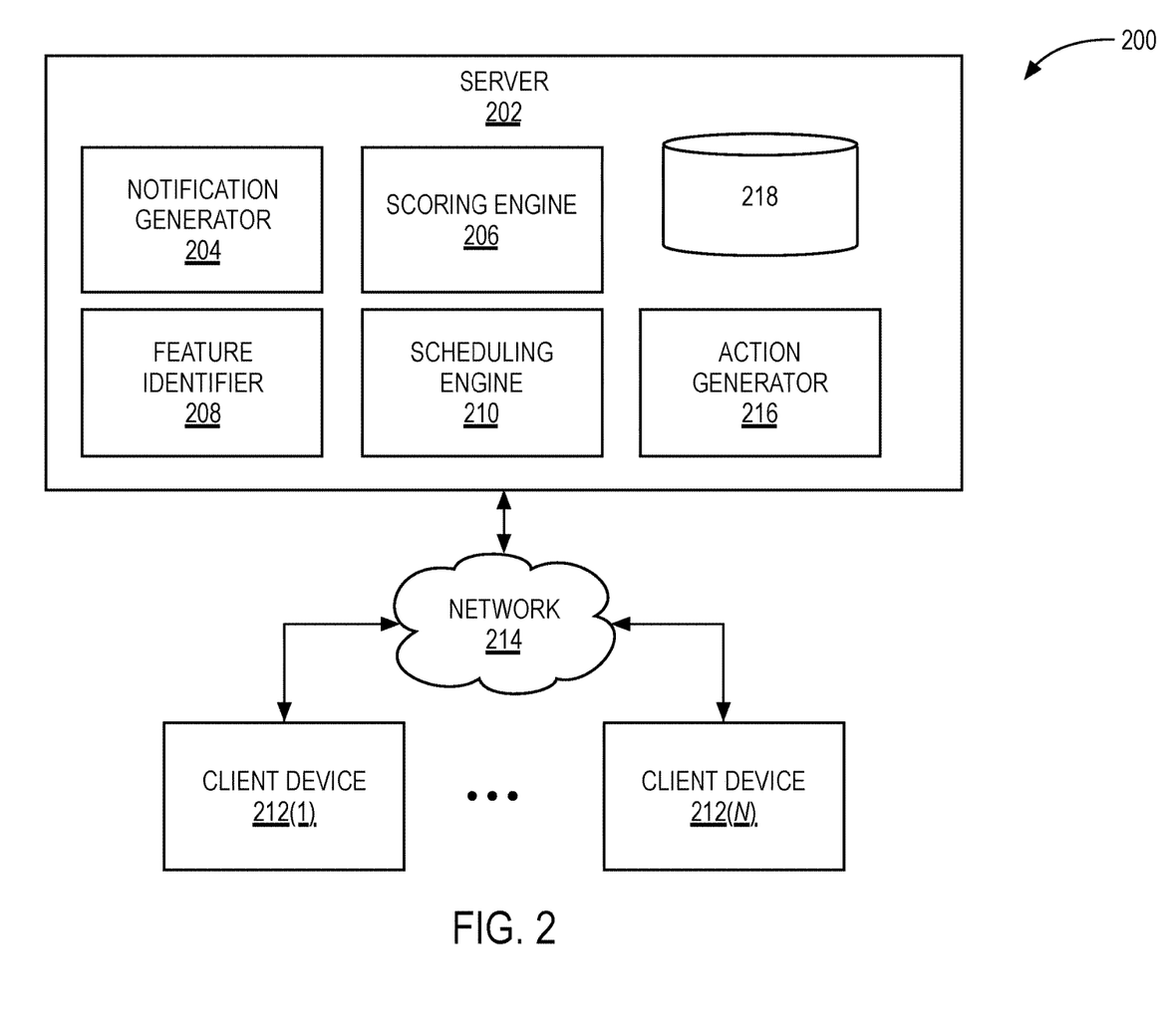
FIG. 2 illustrates a system to reduce transmission times in a networked system.

FIG. 2 illustrates a system 200 to reduce transmission times in a networked system. The system 200 can include one or more servers 202, which can be data processing systems. The server 202 can communicate with a plurality of client devices 212(1)-212(N) (which can collectively be referred to as client devices 212) via a network 214. The server 202 can include a notification generator 204, a scoring engine 206, a feature identifier 208, scheduling engine 210, an action generator 216, and a database 218.

The server 202 can be one or more of the computers 101 or other data processing systems. The server 202 can include memory 128 that stores one or more applications 116. The applications 116 can include machine-readable instructions to perform the functions performed by the server 202. The server 202 can execute applications 116, scripts, or other machine-readable instructions such as the notification generator 204, scoring engine 206, feature identifier 208, scheduling engine 210, and an action generator 216. The server 202 can communicate with a plurality of client devices 212 via the network 214.

The server 202 and client devices 212 can communicate via one or more electronic communication links that can form the network 214. The network 214 can be a local-area network (LAN) (e.g., a company Intranet), a metropolitan area network (MAN), a wide area network (WAN) (e.g., the Internet), or any combination thereof.

The system 200 can include a plurality of client devices 212 that communicate with the server 202 via the network 214. Each of the client devices 212 can be an instance of the computer 101 described in relation to FIG. 1. The client devices 212 can include one or more processors configured to execute machine-readable instructions. The client devices 212 can include one or more of a desktop computer, a laptop computer, a handheld computer, a tablet computing platform, a NetBook, a mobile device, a gaming console, and/or other computing platforms.

The server 202 can include an action generator 216. The action generator 216 can be any script, file, program, application, set of instructions, or computer-executable code, that is configured to enable a computing device on which the action generator 216 is executed to generate the actions of a distributed process. The action generator 216 can generate distributed processes to complete computational processes. The action generator 216 can divide a distributed process in to a plurality of actions. The server 202 can assign each of the actions to a different one of the client devices 212 for execution or completion. A distributed process can be any computational processes that can be divided into a plurality of sub-tasks. The distributed process can be a computational calculation that is divided into sub-tasks and each of the sub-tasks are executed by a client device 212. The distributed process can be a workflow. The workflow can include a plurality of sub-tasks that are completed by a client device 212 or a user using the client device 212. A workflow can include document generation, which can include sub-tasks or actions that can include initial generation, review, editing, approval, and authorization. The workflow for the generation of a web-based document can be managed by the server 202. The action generator 216 can divide the workflow into the actions (e.g., review, editing, approval, etc.). Each action can be assigned to a user or client device 212.

In some implementations, the actions can have a serial order such that a first action must be completed before a subsequent action can be started. For example, a review and edit action may need to be completed before the final web-based document can be approved by via a second client device 212. In some implementations, actions can be executed in parallel such that different client devices 212 can execute different actions at substantially the same time. For example, the action generator 216 can generate a distributed process to generate electronic documents. In some implementations, actions can be optional. For example, reviewing a document by a user may be optional and the server 202 can transmit a notification of a subsequent action to another client device 212 prior to receiving an indication that the review action was completed. The action generator 216 can divide the document generation distributed process into separate actions, such as creating a document; reviewing the document; and approving the document. The actions of reviewing the document can be sent to multiple users at multiple client devices 212 that can review the document in parallel.

Once the action generator 216 generates the actions of a workflow, the action generator 216 can store each of the actions in the action database 218. The actions can be stored in the action database 218 as a data structure that includes the workflow to which the action belongs, a user or client device 212 assigned to the action, the action type, a trigger for starting the action, a requirement flag, a notification time and location, and a completion status. The notification time and location can be determined and provided by the scheduling engine 210, as described below. The trigger for starting the action can be an indication of actions or conditions that must be met before the given action can begin. For example, the trigger for an approval action can be that all required, previous actions in the workflow are completed (e.g., their completion status is flagged as done). The requirement flag in the data structure can indicate whether the action is a required action. For example, the review action may not need to be completed by each user. The notification location data in the data structure can indicate a physical location where a notification associated with the action should be transmitted to the assigned client device 212. The notification time data can indicate when (either a specific time or a range of times) of when the notification relating to an action should be transmitted to a client device 212.

The server 202 can include a notification generator 204. The notification generator 204 can be any script, file, program, application, set of instructions, or computer-executable code, that is configured to enable a computing device on which the notification generator 204 is executed to generate notification messages related to one or more actions of a workflow. The notification generator 204 can be configured to generate a notification message for each of the actions in a workflow generated by the action generator 216. For example, the notification generator 204 can generate a first notification for a first action to be performed in a distributed process, a second notification for a second action in the distributed process, etc. The notification generator 204 can process the workflow data structure generated by the action generator 216 and stored in the action database 218 to determine the content of the notification, the recipient client device 212 of the notification, and the transmission parameters of the notification. The transmission parameters can indicate a time (or time window) when the notification generator 204 should transmit the notification to the client device 212. The notification parameters can indicate a location parameter. The location parameter can be a geo-fence within which the client device 212 needs to be for the notification generator 204 to transmit the notification to the client device 212.

For example, the notification generator 204 can include a transmission module and can transmit the notification to a client device 212 when the client device 212 at the start of the time window associated with the action, at the end of the time window associated with the action, or at a time within the time window associated with the action. The notification generator 204 can be configured to transmit the notification to the client device 212 when the client device 212 enters or exits the geo-fence associated with the location parameter of the transmission parameters.

The notification generator 204 can generate the notification as an email message, text message, push notification, chat message, or other form of digital message. The notification can be transmitted to the client device 212 via a specific application executing on the client device 212. For example, the notification can be transmitted within the chat or messaging functionality of a program associated with the action. In this example, if the workflow is for the generation of a web-based document, the notification generator 204 can transmit the notification to the client device 212 within the chat functionality of the application for editing the web-based document.

The notification generator 204 can hold, pause, or delay the transmission of a notification until the transmission parameters have been achieved. For example, when the transmission parameters require the client device 212 to be within a specific geolocation, the notification generator 204 can hold the notification until the client device 212 enters the geolocation.

The server 202 can include a feature identifier 208. The feature identifier 208 can be any script, file, program, application, set of instructions, or computer-executable code, that is configured to enable a computing device on which the feature identifier 208 is executed to determine a plurality of features associated with the actions of the workflow. The features for an action can indicate parameters of the action, parameters for completing the action, parameters of the client device 212 assigned to complete the action, parameters of a client device 212 or user to which the action should be assigned, or any combination thereof. For example, the features can include a geolocation in which the action can be complete, a geolocation of the client device 212 to which the feature is assigned, a type of the action, a duration of the action (e.g., an estimate of the time it should take to complete the action), a due date of the action, a designation or role of the client device 212 or user assigned to the action, historical usage associated with the client device 212 or user assigned to the action, historical usage associated with the type of action (e.g., is the action type generally completed on time or within a specific geo-fence), or time zones associated with the client device 212 or user assigned the action. The feature identifier 208 can determine the features for an action based on historical data associated with actions of the same type or actions assigned to the same user or client device 212.

The server 202 can include a scoring engine 206. The scoring engine 206 can be any script, file, program, application, set of instructions, or computer-executable code, that is configured to enable a computing device on which the scoring engine 206 is executed to calculate confidence levels for the action time windows and geolocations. The confidence level can indicate a likelihood that a client device 212 or user will complete the action at a given location or within a given time window. The scoring engine 206 can use a machine learning based regression algorithm to predict which during which time windows and at which location an action is most likely to be completed. The scoring engine 206 can calculate the confidence score based on the features determined by the feature identifier 208. Based on the confidence levels, the scheduling engine 210 can select during which time window and at which location the notification generator 204 should send a notification to a respective client device 212. The machine learning model can use reinforcement learning techniques to update the model as additional actions are completed.

In one example, the action generator 216 can generate a workflow with a plurality of actions. For the workflow's actions, the scoring engine 206 can identify different time windows and/or locations when the action can be completed based on the identified features. The scoring engine 206 can, for each of the plurality of time windows, calculate a confidence value indicating a likelihood that the action will be completed during each of the respective plurality of time windows. The likelihood can be a probability. The scoring engine 206 can select the time window and/or geolocation with the highest confidence value as the time window and/or geolocation in which to transmit the notification message to the client device 212.

For example, the scoring engine 206 can determine with a 99% confidence score that the user of a first client device 212 will complete the task between 9 AM and 5 PM (a first time window) and a 95% confidence score that the user of the first client device 212 will complete the task between 2 PM and 3 PM (a second time window).

The server 202 can include a scheduling engine 210. The scheduling engine 210 can be any script, file, program, application, set of instructions, or computer-executable code, that is configured to enable a computing device on which the scheduling engine 210 is executed to select transmission parameters for action notifications. The notification generator 204 can transmit the notifications to the respective client devices 212 based on the transmission parameters. The transmission parameters can indicate during which time window and/or at which geolocation the notification generator 204 should transmit the notification to the client device 212.

The scheduling engine 210 can be configured to select a time window and/or geolocation from the plurality of time windows for one of the plurality of device locations based at least on the confidence value of the time window. For example, the scheduling engine 210 can select the time window and/or geolocation that has the highest confidence score. The scheduling engine 210 can select the time window and/or geolocation based on at least the time window duration and the confidence score. For example, a first time window may have a duration of 8 hours and a confidence score that the action will be completed during the first time window of 99%. A second time window may have a duration of 1 hour and a confidence score of 95%. The scheduling engine 210 can negatively weight time windows with a long time duration. Continuing the previous example, the scheduling engine 210 can select the second time window because the confidence score associated with the second time window is similar confidence score of the first time window, but the second time window is much shorter.

Figure 3:
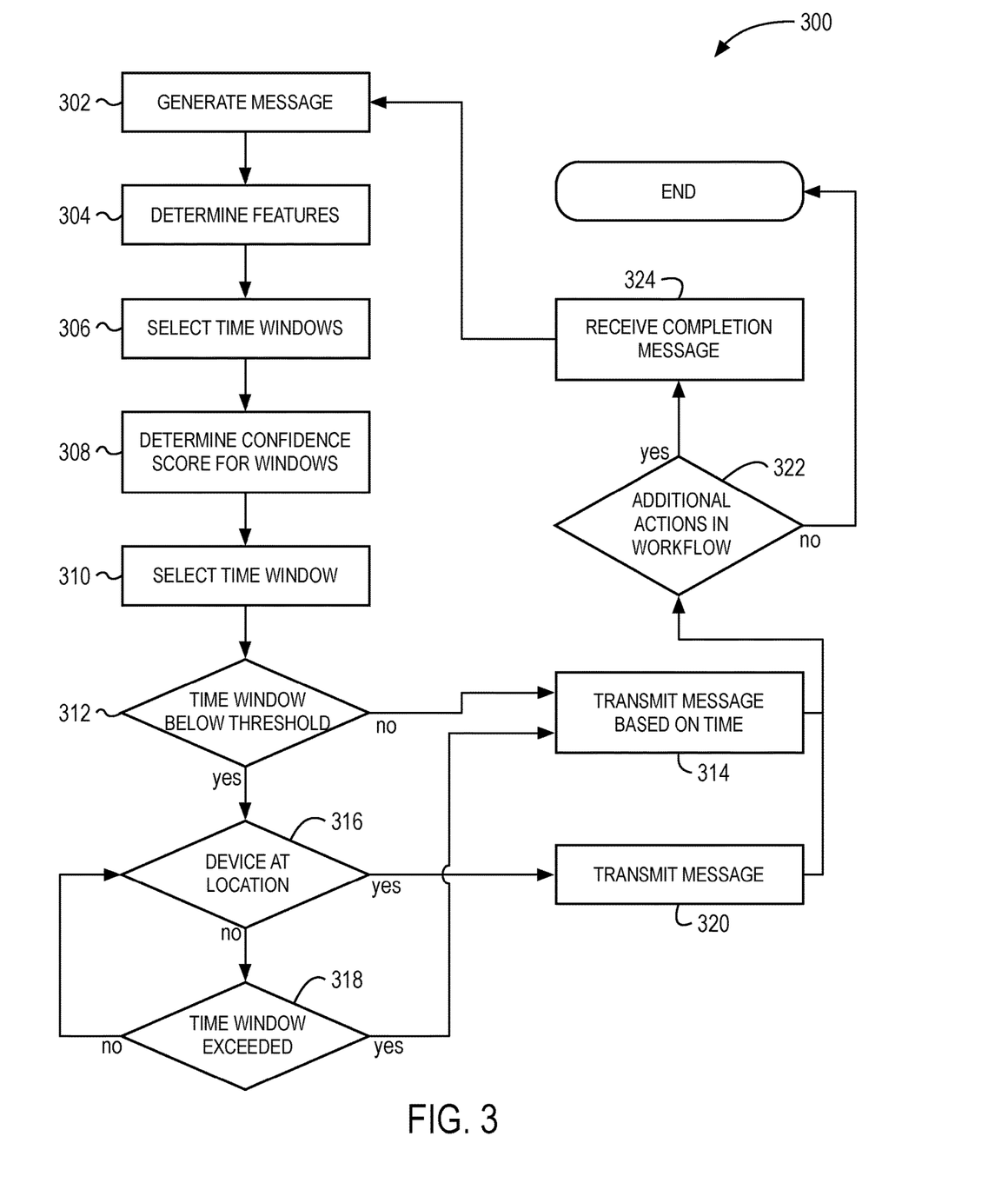
FIG. 3 illustrates a block diagram of an example method to reduce the time to complete distributed processes.

FIG. 3 illustrates a block diagram of an example method 300 to reduce the time to complete distributed processes. The method 300 can include generating a notification message, which can also be referred to as a notification (BLOCK 302). Also referring to FIG. 1, the server 202 can generate a workflow that includes a plurality of actions. The method 300 can be repeated for each of the actions in the distributed process workflow.

The method 300 can include determining features (BLOCK 304). The server 202 can determine a plurality of features associated with each of the actions in the distributed process workflow. The action features can be features specifically of the action and/or features of the client device 212 or user assigned to the action. The action features can include at least one of location information, action duration, historical usage, a time zone, or a user designation. The location information can indicate where the action should be completed. For example, a user may use multiple client devices 212 at different locations or have a client device 212 (such as a laptop or mobile device) that the user can use at different locations. Some actions may only be able to be completed when the user is in a specific location and the location information can be a geolocation associated with that specific location. The action duration can be predictions of how long the action is predicted to take to complete. The durations can be specific times or time windows (e.g., 30 minutes or between about 1 hour and about 2 hours) or the durations can be general descriptors of the time duration (e.g., short, medium, or long time commitment).

The method 300 can include selecting time windows (BLOCK 306). The server 202 can select, for each action, plurality of time windows during which the assigned client device 212 or user can complete the action. In some implementations, if the action can be completed at multiple devices or geolocations, the server 202 can select time windows for each of the multiple devices or geolocations. The server 202 can select the time windows by binning times before the action's due date based on the action duration. For example, if the action duration is 1 hour, the server 202 can generate a plurality of 1 hour time windows prior to the actions due date. The selected time windows can be the same size as the action duration or can be longer. For example, the server 202 can select 4 hour time windows for an action with a 1 hour duration.

The time windows can be based on historical data associated with the action type and user (or client device 212) to which the action is assigned. For example, the server 202 can use a machine learning algorithm to determine when and at what geolocations a user is likely to complete an action. For example, the server 202 can determine that a user completes most actions between 9 AM and 5 PM and the server 202 can indicate 9 AM to 5 PM as a first time window. The server 202 can determine that the user completes a relatively high percentage of the actions between 2 PM and 3 PM and can indicate 2 PM to 3 PM as a second time window. The server 202 can also generate time windows for different geographical locations. For example, the server 202 can determine that the user completes a higher percentages of actions at a second geolocation between 10 AM and 11 AM.

The method 300 can include determining a confidence score for the time windows (BLOCK 308). The method 300 can include determining, for each of the plurality of time windows, a confidence value indicating a likelihood a given action will be completed during the respective time window. The server 202 can calculate a confidence score for each of the time windows or only a portion of the time windows determined at BLOCK 306. For example, the server 202 may interface with a calendaring system and may not calculate confidence scores for windows that overlap with schedule appointments of a user associated with the assigned client device 212 or during time windows to which actions have already been assigned. In this example, the server 202 may discard those time windows as possible time windows that can be selected for the transmission of the notification. The confidence score for each of the time windows can also be based on a client device 212 location (or predicted location). The client device 212 can be a mobile device that the user could move between a first location and a second location. The server 202 can assign a higher confidence score to a first time window that is associated with the first location because the server 202 determines, based on historical data, that the user completes a greater percentage of actions when at the first location.

The method 300 can include selecting a time window (BLOCK 310). The server 202 can select a time window from the plurality of time windows for one of the plurality of device locations based at least on the confidence value of the time window. The server 202 can select the time window and/or geolocation based on which time window and/or geolocation has the highest confidence score. The server 202 can select the time window and/or geolocation based on a confidence score that is weighted based on the duration of the time window. Shorter duration time windows can be weighted higher than longer duration time windows. For example, a 1 hour time window with a 95% confidence score can be selected over an 8 hour time window with a 99% confidence score.

Once a time window is selected, the method 300 can include determining if the time window is below a threshold (BLOCK 312). The threshold can be a time duration threshold. At BLOCK 312, the server 202 can determine if the time window is short in duration or long in duration. The threshold can be about 10 minutes, about 30 minutes, about 1 hours, about 2 hours, about 3 hours, or about 4 hours. The server 202 can classify time windows below the threshold as relatively "short" time windows and time windows above the threshold as relatively "long" time windows.

If the time window is below the threshold, the method 300 can include determining if the device is at the location (BLOCK 316). The server 202 can poll or request the client device 212 at predetermined intervals for the client device's location. In some implementations, the client device 212 can transmit an indication of its location to the server 202 at predetermined intervals or when the location updates. The server 202 may only check the client device location against the location associated with the action once the within the time window identified by the time window selected at BLOCK 310.

When the time window is below the threshold, the server 202 can hold the notification message until the client device 212 reaches the geolocation associated with the time window because it can be the location that influences the completion of the task more than the time. For example, a manager (e.g., the user) may complete actions upon visiting a specific site the manger oversees. In this example, the time window may be relatively short because the manager completes the actions shortly after arriving at the specific site. In this example, the server 202 can determine that the site (e.g., the geolocation) is more influential in predicting when the action will be completed than the specific time window.

If the time window is above the threshold, the method 300 can include transmitting the message based on time (BLOCK 314). The server 202 can transmit the notification message based on the time window selected at BLOCK 310. When transmitting the notification message based on time, the server 202 can transmit the notification message at the beginning, end, or during the time window.

In some implementations, when transmitting the notification message to the client device 212 (at BLOCKS 314 or 320), the server 202 can prefetch content (or more generally, data) associated with the action. When prefetching the data, the server 202 can retrieve the data and store the data in a buffer so that the date can be access more quickly when the client device 212 requests the data in completing the action associated with the notification message. In some implementations, when prefetching the data, the server 202 can retrieve the data and transmit the data to the client device 212 to which the notification message was or will be transmitted. By prefetching the data to the client device 212, the client device 212 (or user thereof) can begin working on the data once the notification message is selected or activated. For example, the action can be to review an electronic document. When transmitting the notification message to the client device 212, the server 202 can prefetch the electronic document to the client device 212. When the user selects the notification message to review the electronic document, the user can immediately begin to review the prefetched document rather than having to wait to download the document and then review the document once the download is complete.

If at BLOCK 316, the device is within the location, the method 300 can include transmitting the notification message to the client device (BLOCK 320). The server 202 can transmit the notification message to the client device 212 once it is within the location and at a time after the start of the time window. The server 202 can transmit the notification message to client device 212 via a network. The notification message can be a text message, email, SMS, push notification, chat message, or other form of electronic communication.

If at BLOCK 316 the device is not within the location, the server can check if the time window is exceeded (BLOCK 318). If the time window is not exceeded (e.g., the current time is not after the end time of the time window), the method 300 can include returning to BLOCK 316 to determine if client device 212 is within the location. The method 300 can include a pause or delay before returning to BLOCK 316. For example, after BLOCK 318, the server 202 may pause for 1, 5, 10, 15, or 30 minutes before repeating BLOCK 316 and checking whether the client device 212 is within the device location. In some implementations, the server 202 may repeat BLOCK 316 and check if the device is at the location based on receiving an updated location for the client device 212. For example, after completing the check to determine if the time window is exceeded, the method 300 can pause at BLOCK 318 until the server 202 receives an indication of an updated device location. If an updated client device location is received before the end of the time window the server 202 can repeat BLOCK 316. If the server 202 does not receive an updated location from the client device 212, the method 300 can continue to (BLOCK 314).

Based on transmitting the message to the client device 212 at BLOCKS 314 and 320, the method 300 can include determining if there are additional actions in the workflow (BLOCK 322). If there are not additional actions in the workflow, the method 300 can end.

If there are additional actions in the workflow, the method 300 can receive a completion message (BLOCK 324). Before transmitting the next action to a client device 212, the server 202 can wait until receiving a completion message from the client device 212 to which the notification message was transmitted at BLOCKS 314 or 320. In some implementations, the server 202 only pauses at BLOCK 324 if the action associated with the notification transmitted at BLOCKS 314 or 320 was flagged as a required action before notifications relating to subsequent actions could be transmitted to respect client devices 212. If the action associated with the notification transmitted at BLOCKS 314 or 320 was not marked as required, the method 300 can continue to BLOCK 302 to repeat the method 300 without waiting for a completion message to be received.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, or a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed:

1. A method comprising:
   identifying, by one or more processors via a notification message generated in association with an action assigned to a user, a duration of the action to be performed by the user via one or more devices of the user and a geolocation at which the action is to be performed;
   determining, by the one or more processors, a plurality of time windows of the action, each time window having a duration corresponding to the duration of the action;
   selecting, by the one or more processors, a time window from the plurality of time windows for the action based at least on a confidence score of each of the plurality of time windows associated with the action, the confidence score indicating a likelihood the action will be completed during the respective time window by a device of the one or more devices of the user;
   holding, by the one or more processors, the notification message until the selected time window is above a threshold and the device is at the geolocation; and
   transmitting, by the one or more processors responsive to the selected time window being above the threshold, the notification message to the device.

2. The method of claim 1, further comprising selecting, by the one or more processors, the time window based at least on the confidence score of the geolocation of the one or more devices.

3. The method of claim 1, further comprising determining, by the one or more processors, the plurality of time windows based at least on historical data associated with a type of the action.

4. The method of claim 1, further comprising determining, by the one or more processors, the plurality of time windows based at least on one of a user or the device to which the action is assigned.

5. The method of claim 1, further comprising transmitting, by the one or more processors, the notification message at one of a beginning or a time during the selected time window.

6. A system comprising:
   one or more processors, coupled to memory and configured to:
      identify, via a notification message generated in association with an action assigned to a user, a duration of the action to be performed by the user via one or more devices of the user and a geolocation at which the action is to be performed;
      determine a plurality of time windows of the action, each time window having a duration corresponding to the duration of the action;
      select a time window from the plurality of time windows for the action based at least on a confidence score of each of the plurality of time windows associated with the action, the confidence score indicating a likelihood the action will be completed during the respective time window by a device of the one or more devices of the user;
      hold the notification message until the selected time window is above a threshold and the device is at the geolocation; and
      transmit, responsive to the selected time window being above the threshold, the notification message to the device.

7. The system of claim 6, wherein the one or more processors are further configured to select the time window based at least on the confidence score of the geolocation of the one or more devices.

8. The system of claim 6, wherein the one or more processors are further configured to determine the plurality of time windows based at least on historical data associated with a type of the action.

9. The system of claim 6, wherein the one or more processors are further configured to determine the plurality of time windows based at least on one of a user or the device to which the action is assigned.

10. The system of claim 6, wherein the one or more processors are further configured to transmit the notification message at one of a beginning or a time during the selected time window.

11. A non-transitory computer-readable medium comprising instructions that, when executed by one or more processors, cause the one or more processors to:
    identify, via a notification message generated in association with an action assigned to a user, a duration of the action to be performed by the user via one or more devices of the user and a geolocation at which the action is to be performed;
    determine a plurality of time windows of the action, each time window having a duration corresponding to the duration of the action;

select a time window from the plurality of time windows for the action based at least on a confidence score of each of the plurality of time windows associated with the action, the confidence score indicating a likelihood the action will be completed during the respective time window by a device of the one or more devices of the user;

hold the notification message until the selected time window is above a threshold and the device is at the geolocation; and transmit, responsive to the selected time window being above the threshold, the notification message to the device.

12. The computer-readable medium of claim 11, further comprising instructions that, when executed by the one or more processors, cause the one or more processors to select the time window based at least on the confidence score of the geolocation of the one or more devices.

13. The computer-readable medium of claim 11, further comprising instructions that, when executed by the one or more processors, cause the one or more processors to determine the plurality of time windows based at least on historical data associated with a type of the action.

14. The computer-readable medium of claim 11, further comprising instructions that, when executed by the one or more processors, cause the one or more processors to determine the plurality of time windows based at least on one of a user or the device to which the action is assigned.

* * * * *